United States Patent Office.

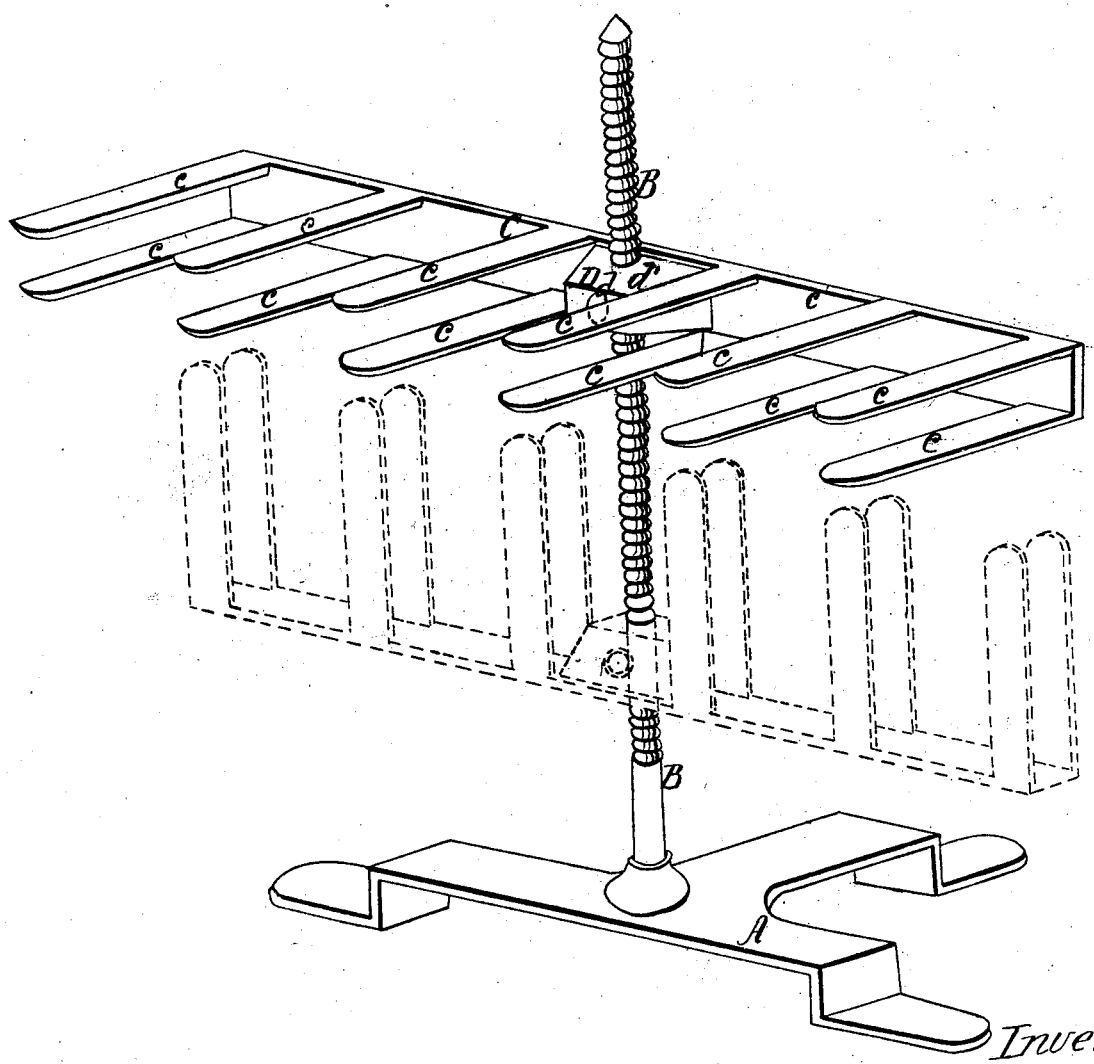

MARY E. A. W. EVARD, OF LEESBURG, VIRGINIA.

*Letters Patent No. 76,316, dated April 7, 1868.*

TOASTER.

*The Schedule referred to in these Letters Patent and making part of the same.*

TO ALL WHOM IT MAY CONCERN:

Be it known that I, MARY E. A. W. EVARD, of Leesburg, in the county of Loudon, and State of Virginia, have invented a new and useful Improvement in Toasters; and I do hereby declare the following to be a full, clear, and exact description of the same, sufficient to enable others skilled in the art to which it appertains to fully understand and use the same, reference being had to the accompanying drawing, which is made a part of this specification.

The subject of this invention is an instrument for holding slices of bread or other substances to be toasted, before or over the fire, at any desired distance from it; and also allowing it, when toasting before the fire, to be turned, so as to toast both sides without removing it from the rack in which it is held. It consists of a rack composed of a double series of spring-fingers mounted upon an upright threaded standard secured in a stand or base, the whole forming an instrument adapted to be placed in any desired position on the stove or hearth.

The drawing is a perspective view of my improved toaster, showing the rack in its vertical and horizontal positions.

A may represent the stand or base in which the standard B is secured. This stand I prefer to construct as represented in the drawings, as by means of it the instrument is adapted to be placed closer to the fire than it could otherwise be; and also to accommodate itself to irregularities in the surface of the hearth or ash-pit cover. The standard B is provided, a portion of its length, with a screw-thread of very rapid pitch, for the reception of the rack C, which is provided with a nut, D, having two similarly-threaded perforations, $d$ $d'$, through it, at right angles, to allow it to be mounted upon said standard, either vertically or horizontally. By means of this thread the rack may be rapidly adjusted to any desired height, to suit different sizes of stoves; and also to hold the stuff being toasted before the most effective part of the fire, or at any desired distance from it. The rack C is formed with spring-fingers, $c$, projecting at about right angles from the solid part, $c'$, which, when the rack is vertical, forms the bottom, and when horizontal, the back of the rack. All the parts of my toaster are made of metal, and may be constructed in any desired manner and form.

Operation.

When it is desired to toast over the fire, the rack C is mounted upon the standard B, in its horizontal position, as represented in black in the drawing, and, being adjusted to the proper height, one or more slices of the bread or other stuff to be toasted are placed between the fingers $c$, and the instrument placed on the front of the stove or hearth, so that the fingers will reach over it, when the rack may be turned until it is brought at the desired distance from the fire. When one side is toasted the rack may be removed and turned, or the toast may be taken from it, turned, and replaced. For toasting the edges before the fire, the rack is mounted and operated in the same way. To toast before the fire, which is the most common way, the rack is mounted in its vertical position, as represented in red, and when one side of the slice is toasted, the other side may be brought into position, by simply giving the rack a half revolution. When desired, the toaster may be set directly upon the fire or fuel, to bring the bread under the more immediate action of the heat.

Having thus described my invention, what I claim as new therein, and desire to secure by Letters Patent, is—

1. The rack C, adapted to be turned upon the standard B, substantially as and for the purpose described.

2. The nut D, formed with threaded perforations, $d$ $d'$, at right angles, to adapt the rack to be supported either vertically or horizontally, substantially as set forth.

M. E. A. W. EVARD.

Witnesses:
 GEO. R. HEAD,
 R. I. C. THOMPSON.